United States Patent
Wada

[11] Patent Number: 5,841,093
[45] Date of Patent: Nov. 24, 1998

[54] ELECTRICAL DISCHARGE APPARATUS AND ELECTRICAL DISCHARGE MACHINING METHOD

[75] Inventor: Mitsuyoshi Wada, Tokyo, Japan

[73] Assignee: Mitsubishi Denki Kabushiki Kaisha, Tokyo, Japan

[21] Appl. No.: 738,070

[22] Filed: Oct. 25, 1996

[30] Foreign Application Priority Data

Mar. 5, 1996 [JP] Japan .................................. 8-047402

[51] Int. Cl.$^6$ .............................. B23H 1/00; B23H 1/02
[52] U.S. Cl. ............................. 219/69.17; 219/69.13; 219/69.14; 219/69.16
[58] Field of Search ............................. 219/69.13, 69.14, 219/69.16, 69.17, 69.12

[56] References Cited

U.S. PATENT DOCUMENTS

| 4,375,588 | 3/1983 | Frei ........................................ 219/69.17 |
| 4,510,365 | 4/1985 | MacGregor et al. ................. 219/69.16 |
| 4,527,034 | 7/1985 | Inoue et al. ........................... 219/69.16 |
| 4,603,391 | 7/1986 | Inoue et al. ........................... 219/69.16 |
| 4,673,791 | 6/1987 | Konno et al. ......................... 219/69.17 |
| 5,118,915 | 6/1992 | Magara ................................. 219/69.13 |
| 5,386,094 | 1/1995 | Kawai et al. ......................... 219/69.14 |
| 5,496,984 | 3/1996 | Goto et al. ............................ 219/69.17 |

FOREIGN PATENT DOCUMENTS

| 536680 | 6/1973 | France . |
| 3339025 | 5/1984 | Germany . |
| 4117620 | 12/1991 | Germany . |
| 57-89522 | 6/1982 | Japan ................................... 219/69.13 |
| 63-318210 | 12/1988 | Japan . |
| 3-251322 | 11/1991 | Japan . |
| 4-63623 | 2/1992 | Japan ............................... B23H 1/02 |
| 5-293714 | 11/1993 | Japan ............................... B23H 1/02 |
| 6-55362 | 3/1994 | Japan . |

*Primary Examiner*—Geoffrey B. Evans
*Attorney, Agent, or Firm*—Sughrue, Mion, Zinn, Macpeak & Seas, PLLC

[57] ABSTRACT

A machining operation end position detecting unit detects the end position for a machining operation at a (k-1)-th step. A machining operation starting position detecting unit detects the starting position for the machining operation at a k-th step. A machining position comparison unit compares them with each other. If the difference between them is less than a predetermined value, a signal is output to a machining condition changing unit and a control valve. As a result, the machining condition is changed, and a powdered substance is fed into a working fluid.

18 Claims, 8 Drawing Sheets

FIG. 6

| NUMBER OF MACHINING STEPS | WORKING FLUID | MACHINING CONDITIONS ||||| DEPTH TO BE MACHINED |
|---|---|---|---|---|---|---|
| | | APPLIED VOLTAGE | PEAK CURRENT | PULSE WIDTH | QUIESCENT TIME | |
| 1 | OIL | $V_{o1}$ | $I_1$ | $T_{on1}$ | $T_{off1}$ | $Z_1$ |
| 2 | OIL | $V_{o2}$ | $I_2$ | $T_{on2}$ | $T_{off2}$ | $Z_2$ |
| 3 | OIL | $V_{o3}$ | $I_3$ | $T_{on3}$ | $T_{off3}$ | $Z_3$ |
| ... | ... | ... | ... | ... | ... | |
| k-1 | OIL | $V_{ok-1}$ | $I_{k-1}$ | $T_{onk-1}$ | $T_{offk-1}$ | $Z_{k-1}$ |
| k | MIXED WITH POWDER | $V_{ok}$ | $I_k$ | $T_{onk}$ | $T_{offk}$ | $Z_k$ |
| ... | ... | ... | ... | ... | ... | ... |
| n-1 | MIXED WITH POWDER | $V_{on-1}$ | $I_{n-1}$ | $T_{onn-1}$ | $T_{offn-1}$ | $Z_{n-1}$ |
| n | MIXED WITH POWDER | $V_{on}$ | $I_n$ | $T_{onn}$ | $T_{offn}$ | $Z_n$ |

ELECTRICAL DISCHARGE APPARATUS AND ELECTRICAL DISCHARGE MACHINING METHOD

BACKGROUND OF THE INVENTION

The present invention pertains to an electrical discharge apparatus and an electrical discharge machining method designed so as to render a machining operation stable and optimum principally on the basis of positional information about an electrode.

In the field of electrical discharge die-milling, a multistage electrical discharge machining method is becoming popular. According to this method, a desired shape is obtained as a result of switching a roughing operation to a finishing operation by varying machining conditions, such as a peak current and a pulse width, and the position of an electrode in several stages. For the case where a surface is finished to a desired roughness by electrical discharge machining, it will take a considerably long time to finish the surface if the surface is finished from the outset, because the finishing operation requires a small amount of electrical energy. To prevent this problem, most of the areas to be roughed are removed by a roughing operation, in which the machined surface has large roughness but the machining operation is carried out at high speed with a large amount of electrical energy. Subsequently, the machining requirements are gradually switched, namely, the amount of electrical energy is reduced to a smaller extent, and the depth to be machined is progressively increased. The multistage electrical discharge machining operation, which provides desired surface roughness, is commonly used for its high machining efficiency. Recently, it has become popular to switch a machining operation to a powder-mixed electrical discharge machining operation during the course of the multistage electrical discharge machining operation. In this powder-mixed electrical discharge machining operation, a powder-mixed working fluid, which includes the mixture of ordinary working fluid oil and a metal or semimetal powder, is poured into the gap between the electrode and the workpiece to be machined. As a result, the surface to be machined is mirror-finished.

By means of the powder-mixed electrical discharge machining operation, the area to be machined which measures as large as about 500 (cm$^2$) can be mirror-finished to a surface roughness of 1–2 ($\mu$m Rmax) as a result of the finishing operation. Further, the powder-mixed electrical discharge machining method has such a considerably superior advantage that the machining operation is carried out several times faster than in the conventional machining operation. However, there is no substantial difference between an ordinary working fluid and the powder-mixed working fluid in terms of the machining characteristics. For this reason, the workpiece is machined from the first stage to the stage where the roughness of the machined surface becomes 10–20 ($\mu$m Rmax) using the ordinary working fluid, allowing for the lifetime of the powder and the filtration of the working fluid. In the remaining stages, the machining operation is continued by switching the working fluid to the powder-mixed working fluid.

A conventional powder-mixed electrical discharge apparatus will be described referring to FIG. 7. In FIG. 7, reference numeral 1 designates an electrode, 2 is a workpiece, 3 is a machining bath, 4 is a control unit, 5 is a machining power source for feeding a discharge pulse between the gap between the electrode 1 and the workpiece 2, 6 is an averaging circuit for averaging a discharge voltage developing in the gap, 7 is a reference voltage setting unit which sets a reference voltage with respect to the discharge voltage averaged by the averaging circuit 6, 8 is a servo motor which is actuated under control of the control unit 4, 9 is a slider which fixedly holds the electrode 1 and is actuated in the direction of the Z axis by the servo motor 8 via a ball screw 10, 11 is a linear scale for detecting the position of the electrode 1, 12 is a working fluid tank in which ordinary working fluid oil 14 is stored, 13 is a working fluid tank in which a powder-mixed working fluid 16 including the mixture of a powdered substance 15 is stored, 17 and 18 are pumps which pump the working fluid from the working fluid tanks 12 and 13 to the machining bath 3 under the control of the control unit 4, and 19, 20, 21, and 22 are control valves which open and close in response to instructions from the control unit 4.

Next, the operation of the conventional powder-mixed electrical discharge apparatus will be described. For the case where the surface is machined until it has desired surface roughness and a desired shape while machining requirements and the electrode position of the machining requirements are changed in several stages, the ordinary working fluid 14 in the working fluid tank 12 is pumped up by the pump 17. The pumped up working fluid oil is fed to the machining bath 3 via the control valve 20. After a sufficient amount of the ordinary working fluid 14 has been fed to the machining bath 3, the control unit 4 issues an instruction to the machining power source 5. Upon receipt of the instruction, the machining power source 5 switches the working requirements to those of the first stage and, then, starts an electrical discharge machining operation by feeding an electrical discharge pulse to the gap between the electrode 1 and the workpiece 2. At this time, the control unit 4 issues an instruction to the servo motor 8, whereby the electrode 1 is moved toward the workpiece 2 in the Z direction. When the linear scale 11 detects the arrival of the electrode 1 at a predetermined depth to be machined Z2 in the first stage, the control unit 4 issues the instruction to the machining power source 5, whereby the machining requirements are switched to those of the second stage. The workpiece is machined to a predetermined depth to be machined Z2 in the second stage. A series of these operations are repeated up to the final stage "n".

A method of controlling the length of the gap between the electrode 1 and the workpiece 2 will be described. If a pulse voltage is applied to the gap from the machining power source 5, a release voltage Vo appears for only a delay time To before the electrical discharge develops. Then, an electrical discharge develops, and a discharge voltage Vg appears during a pulse width Ton, and the next pulse voltage is applied after the lapse of a quiescent time Toff. If the gap becomes smaller than the appropriate distance, an electrical discharge develops immediately, as shown in FIG. 8B. Consequently, the release voltage Vg appears without the time To during which the release voltage Vo develops. If the machining operation is continued in this state, electric arcing arises, thereby damaging the electrode and the workpiece. On the other hand, if the length of the gap becomes longer than the appropriate distance, electrical discharge becomes less apt to arise, as shown in FIG. 8C. This in turn makes the time To of the release voltage Vo very long. As a result, the number of times the electrical discharge arises per unit of time becomes decreased, thereby resulting in the machining efficiency being significantly deteriorated. To prevent variations in the length of the gap, a mean discharge voltage is measured, and the clearance is controlled by comparing the measured release voltage with the reference voltage.

Specifically, as shown in FIG. 8A, a mean value Vave, which is obtained as a result of averaging the discharge voltage arising in the gap using the averaging circuit 6, can be approximated to $$Vave=(Vo \cdot To+Vg \cdot Ton)/(To+Ton+Toff) \qquad (1)$$

The voltage Vave, which is obtained when the length of the gap is appropriate, is previously set as the reference voltage Vref in the reference voltage setting unit 7. If the length of the gap is different from the appropriate distance, the discharge delay time To becomes larger. The value Vave becomes greater than the reference voltage Vref from Equation (1). Upon detection of this increase, the control unit 4 issues the instruction to the servo motor 8. The electrode 1 is controlled so as to come close to the workpiece 2. Conversely, if the length of the gap is much smaller than the appropriate distance, the value Vave becomes smaller than the reference voltage Vref from Equation (1) as a result of the discharge delay time To being reduced. Upon detection of this decrease, the control unit 4 issues the instruction to the servo motor 8, whereby the electrode 1 is moved away from the workpiece 2. The length of the gap is constantly controlled in the range of several micrometers to several tens of micrometers during the electrical discharge machining operation.

The mixed-powder electrical discharge machining operation which is carried out from the k-th stage will now be described. The machining operation is temporarily suspended at the instant when the machining operation in the (k−1)-th stage has been completed. The ordinary working fluid 14 is drained from the machining bath 3 into the working fluid tank 12 via the control valve 19. Upon completion of the drainage of the working fluid, the powder-mixed working fluid 16 is pumped up from the working fluid tank 13 by the pump 18. The pumped up working fluid is fed to the machining bath 3 via the control valve 22. After the sufficient amount of powder-mixed working fluid 16 has been fed into the machining bath 3, the control unit 4 issues the instruction to the machining power source 5. The current machining requirements are switched to those of the k-th stage, and the electrical discharge machining operation is resumed. Concurrently, the control unit 4 issues the instruction to the servo motor 8, and the electrode 1 is moved to a depth to be machined Zk. The powder-mixed electrical discharge machining operation is completed at the instant when the electrode 1 arrives at the depth to be machined Zk.

The Unexamined Japanese Patent Application Publication No. Hei. 4-63623 discloses a method of controlling machining requirements in response to the state of the machining operation in the gap.

SUMMARY OF THE INVENTION

According to studies carried out by the Inventor, the mirror property of a machined surface, which is the major characteristics of a powder-mixed electrical discharge machining operation, is significantly affected by the concentration of the powder mixed in a working fluid. In a common powder-mixed electrical discharge machining operation, the density of the mixed powder is set to 20–30 (g/l) so that a mirror finishing operation can be stably carried out. It is known that the finished surface will become rougher if the concentration of the mixed powder falls to less than 10 (g/l). As a result, the machined surface does not become mirror finished.

However, if the powder-mixed working fluid is used, the powdered substance precipitates out of the working fluid as a result of stagnation of the working fluid stream caused by stirring the working fluid, because the specific gravity of the metal or semimetal powdered substance contained in the working fluid oil is greater than that of the working fluid oil. For this reason, as the time required by the powder-mixed electrical discharge machining operation becomes longer, the concentration of the powdered substance 15 contained in the powder-mixed working fluid 16 becomes reduced. Consequently, the concentration of the mixed powder in the gap formed between the electrode 1 and the workpiece 2 becomes reduced. If the concentration of the mixed powder drops below 10 (g/l), a desired mirror surface will not be obtained.

The powdered substance 15 deposited in the powder-mixed electrical discharge machining operation is mixed with the working fluid oil 14 because the ordinary working fluid oil 14 is fed into the machining bath 3 during the next oil machining operation, and the thus mixed fluid is supplied to the working fluid tank 12. Therefore, the concentration of the mixed powder in the powder-mixed working fluid tank 13 becomes decreased. If the concentration of the mixed powder drops below 10 (g/l), a desired mirror surface will not be obtained.

If the electrode 1 has a complicated profile, and if the depth to be machined is large, the powdered substance 15 is insufficiently fed to the gap between the electrode 1 and the workpiece 2. As a result, even if the concentration of the mixed powder in the gap decreases below 10 (g/l), a desired mirror surface will not be obtained.

The technique disclosed in the Unexamined Japanese Patent Application Publication No. Hei. 4-63623 is directed to the stable control of the condition of an oil machining operation by means of a working fluid. Therefore, it is impossible to identify the machining condition as a result of a drop in the concentration of the mixed powder.

The present invention has been conceived to solve the above described drawbacks in the prior art, and the object of the present invention is to prevent the mirror property of a machined surface from being deteriorated as a result of a decrease in the concentration of a mixed powder in a machining gap between an electrode and a workpiece, as well as to obtain a desired mirror surface (desired surface roughness).

According to a first aspect of the present invention, there is provided an electrical discharge apparatus for machining a workpiece by applying a pulse voltage within a working fluid which includes a mixture of a powdered substance and is filled into a gap between an electrode and the workpiece, when a multistage machining operation is carried out, the electrical discharge apparatus comprising:

means for detecting a starting position for a machining operation at each step;

means for detecting an end position for the machining operation at each step;

means for comparing an end position for the machining of a previous step detected by the means for detecting an end position for the machining operation with a starting position for the machining operation of a next step detected by the step of detecting a starting position for the machining operation; and means for changing machining conditions depending on a comparison result output from the means for comparing the positions for the machining operation.

The machining position comparison means preferably determines that the concentration of the powdered substance in the work fluid is small, if the difference between the starting position for the machining of the next step detected by the machining starting position detecting means and the end position for the machining of the previous step detected by the machining end position detecting means is smaller than a predetermined value.

The electrical discharge apparatus is preferably provided with means for feeding the powdered substance into the working fluid if the machining position comparison means has determined that the concentration of the powdered substance in the working fluid is small.

According to a second aspect of the present invention, there is provided an electrical discharge apparatus for machining a workpiece by applying a pulse voltage within a working fluid which includes a mixture of a powdered substance and is filled into a gap between an electrode and the workpiece, the electrical discharge apparatus comprising:

means for counting the number of the effective electrical discharge pulses which contribute to a machining operation for every predetermined time;

means for setting the amount of the workpiece to be machined per electrical discharge pulse under each electrical discharge machining condition;

means for setting an area to be machined under each electrical discharge machining condition;

means for calculating a scheduled distance over which the electrode travels during a predetermined period of time, from the number of the effective electrical discharge pulses detected by the means for counting the number of the effective electrical discharge pulses, the amount of the workpiece to be machined per electrical discharge pulse set in the means for setting the amount of the workpiece to be machined, and the area to be machined set in the means for setting the area to be machined;

means for detecting the distance over which the electrode actually travels during the machining operation, for every predetermined time;

means for comparing the scheduled travel distance calculated by the means for calculating a scheduled travel distance with the actual travel distance detected by the means for detecting the distance over which the electrode travel distance; and means for changing the machining conditions in response to a comparison result output from the means for comparing the electrode travel distances.

The electrode travel distance comparison means preferably determines that the concentration of the powdered substance in the work fluid is small, if the difference between the travel distance of the electrode detected by the electrode travel distance detecting means and the scheduled travel distance calculated by the electrode travel distance calculating means is more than a predetermined value.

The electrical discharge apparatus is preferably provided with means for feeding the powdered substance into the working fluid if the electrode travel distance comparison means judges that the concentration of the powdered substance in the working fluid is small.

Further, the machining condition changing means preferably changes the reference voltage with respect to a discharge voltage developing in the gap.

The machining condition changing means preferably changes the quiescent time of an electrical discharge.

The machining condition changing means preferably changes the regular amount of lift of the electrode.

According to a third aspect of the present invention, there is provided an electrical discharge machining method for machining a workpiece by applying a pulse voltage within a working fluid which includes a mixture of a powdered substance and is filled into a gap between an electrode and the workpiece, when a multistage machining operation is carried out, the electrical discharge machining method comprising the steps of:

detecting a starting position for the machining at each step;

detecting an end position for the machining at each step;

comparing the detected end position for the machining of a previous step with the detected starting position for the positioning of a next step; and changing the machining conditions depending on a comparison result output obtained in the step of comparing the positions for the machining operation.

In the machining position comparison step, it is preferably determined that the concentration of the powdered substance in the work fluid is small, if the difference between the starting position for the machining of the next step detected at the machining starting position detecting step and the end position for the machining of the previous step detected at the machining end position detecting step is smaller than a predetermined value.

The electrical discharge machining method preferably further includes a step for feeding the powdered substance into the working fluid if it has been determined that the concentration of the powdered substance in the working fluid is small.

According to a fourth aspect of the present invention, there is provided an electrical discharge machining method for machining a workpiece by applying a pulse voltage within a working fluid which includes a mixture of a powdered substance and is filled into a gap between an electrode and the workpiece, the electrical discharge machining method comprising the steps of:

counting the number of the effective electrical discharge pulses which contribute to a machining operation for every predetermined time;

setting the amount of the workpiece to be machined per electrical discharge pulse under each electrical discharge machining condition;

setting an area to be machined under each electrical discharge machining condition;

calculating a scheduled distance over which the electrode travels during a predetermined period of time, from the number of the effective electrical discharge pulses detected by the step of counting the number of the effective electrical discharge pulses, the amount of the workpiece to be machined per electrical discharge pulse set in the step of setting the amount of the workpiece to be machined, and the area to be machined set in the step of setting the area to be machined;

detecting the distance over which the electrode actually travels during the machining operation, for every predetermined time;

comparing the scheduled travel distance calculated by the step of calculating a scheduled travel distance with the actual travel distance detected by the step of detecting the distance over which the electrode travels; and changing the machining conditions in response to a comparison result output from the step of comparing the electrode travel distances.

In the electrode travel distance comparison step, it is preferably determined that the concentration of the powdered substance in the work fluid is small, if the difference between the travel distance of the electrode detected by the electrode travel distance detecting step and the scheduled travel distance calculated by the electrode travel distance calculating step is more than a predetermined value.

The electrical discharge machining method is preferably provided with a step for feeding the powdered substance into the working fluid if the electrode travel distance comparison step judges that the concentration of the powdered substance in the working fluid is small.

BRIEF DESCRIPTION OF THE DRAWINGS

FIG. 6 is a table showing the outline of a multistage electrical discharge machining method;

DETAILED DESCRIPTION OF THE PREFERRED EMBODIMENTS
(FIRST EMBODIMENT)

Figure 1:
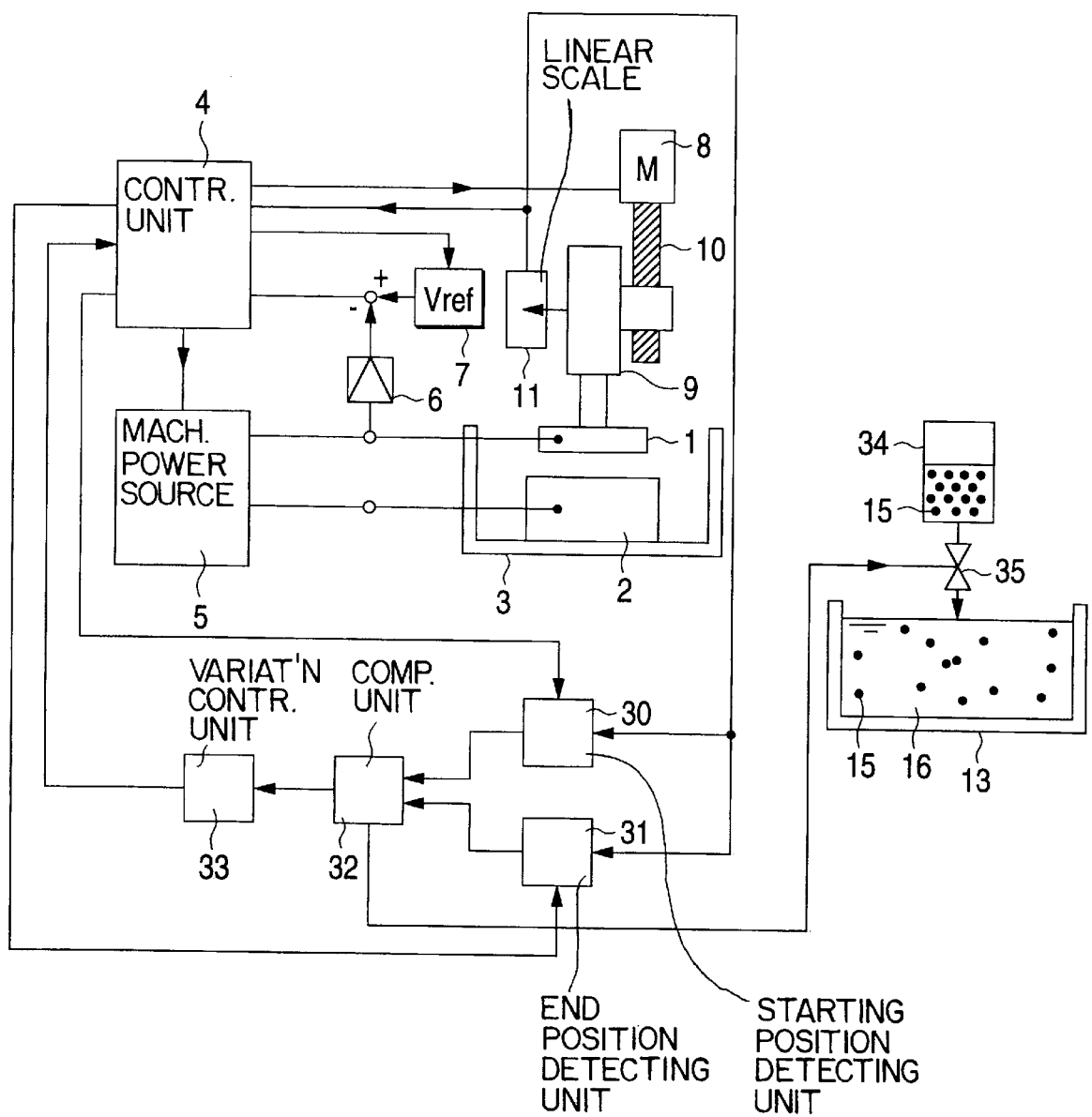
FIG. 1 is a block diagram showing the configuration of an electrical discharge apparatus according to a first embodiment of the present invention.
Figure 2:
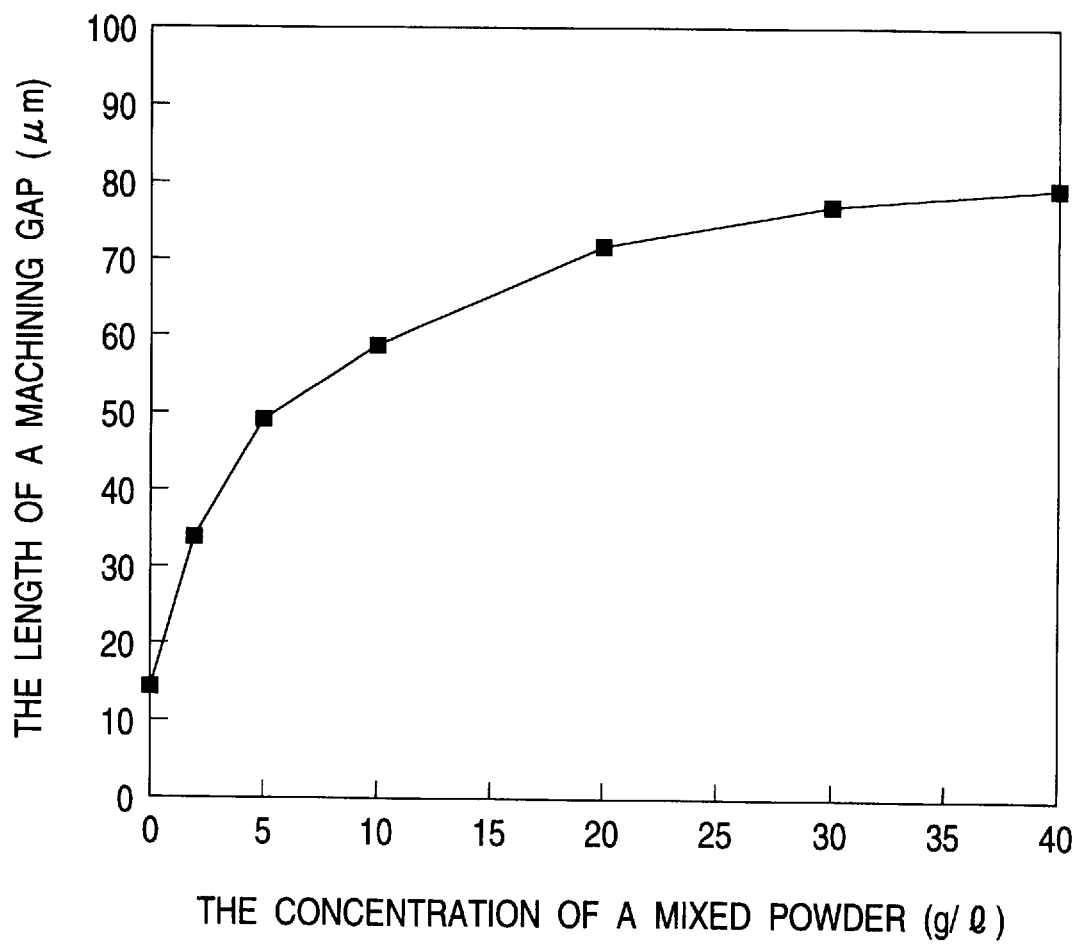
FIG. 2 is a plot showing the relationship between the concentration of a mixed powder and the length of a machining gap.
Figure 3:
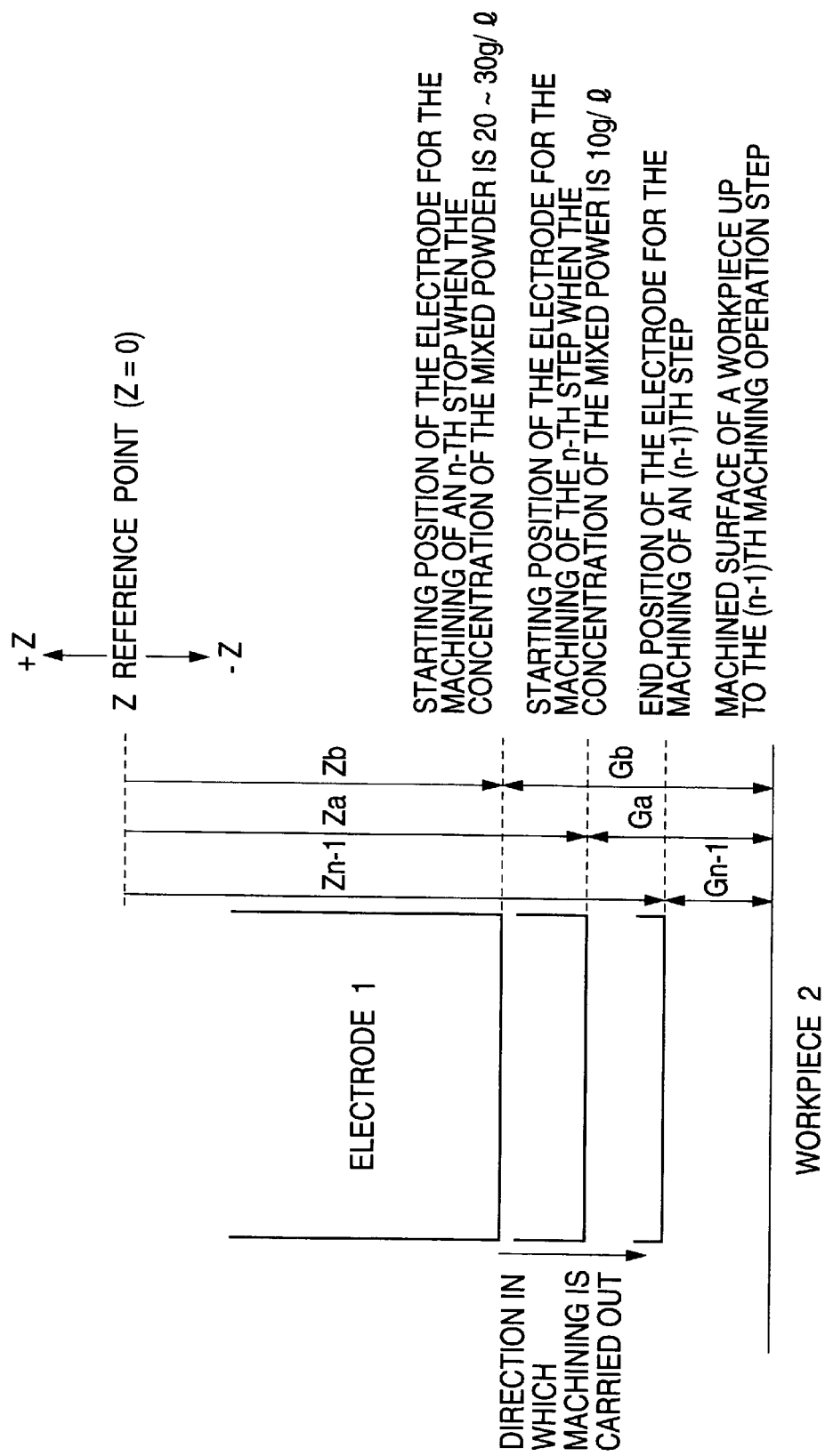
FIG. 3 is a schematic representation showing the relationship between the position of an electrode and the length of the machining gap in the case of a multistage electrical discharge machining operation.

With reference to FIGS. 1 through 3, an electrical discharge apparatus according to a first embodiment of the present invention will be described. Throughout the drawings, the same reference numerals are provided to designate the corresponding elements of the conventional electrical discharge machine, and hence their explanations will be omitted.

FIG. 1 is a block diagram showing the configuration of the electrical discharge apparatus according to the first embodiment of the present invention. As shown in FIG. 1, the electrical discharge apparatus comprises a unit 30 for detecting the starting position for a machining operation at every step, a unit 31 for detecting the end position for the machining operation at every step, a unit 32 for comparing the end position for the machining in a certain step detected by the machining operation end position detecting unit 31 with the starting position for the machining of the next step detected by the machining operation starting position detecting unit 30, a unit 33 for controlling variations in machining conditions in response to the result of the comparison made by the machining position comparison unit 32, and a unit 34 which contains a powdered substance and feeds a powdered substance 15 into a powder-mixed working fluid tank 13.

The operation of the electrical discharge apparatus will next be described. As previously described, for the cases where the powdered substance 15 deposited in the machining bath 3 is flushed away to the working fluid tank 12 while it is mixed with an ordinary working fluid 14, where the electrode 1 has a complicated profile, and where the depth to be machined is large, a mirror surface will not be obtained if the concentration of the mixed powder in the gap decreases to less than 10 (g/l). FIG. 2 shows the relationship between the concentration of the mixed powder and the length of the gap. The smaller the concentration of the mixed powder becomes, the shorter the length of the gap becomes even under identical machining conditions. Accordingly, it is possible to prevent the mirror property of a machined surface from being deteriorated by detecting the decrease in the length of the gap resulting from a drop in the concentration of the mixed powder, and by increasing the concentration of the mixed powder according to the result of the detection.

FIG. 3 shows the relationship between the position of the electrode 1 and the length of the gap when a powder-mixed electrical discharge machining is carried out in several steps. As can be seen from FIG. 2, the length of the gap obtained when the concentration of the mixed powder is 20 to 30 (g/l) is larger than the gap length obtained when the concentration of the mixed powder is less than 10 (g/l). For this reason, the powder-mixed electrical discharge machining starting position in the k-th step obtained when the concentration of the mixed powder is less than 10 (g/l) is slightly forward in the direction of the advancement of the electrode with respect to the starting position obtained when the concentration of the mixed powder is under 20 to 30 (g/l), by only the difference in length between the gaps. Assuming that the starting position for the electrical discharge machining of the (k−1)-th step is represented by Zk−1, that the powder-mixed electrical discharge machining operation at the k-th step obtained when the concentration of the mixed powder is 10 (g/l) is represented by Z, that the length of the gap obtained when the concentration of the mixed powder is 10 (g/l) is represented by Ga, that the starting position for the powder-mixed electrical discharge machining of the k-th step obtained when the concentration of the mixed powder is 20 to 30 (g/l) is represented by Zb, and that the length of the gap obtained when the concentration of the mixed powder is represented by Gb, $$Zb-Z=(Zb-Zk-1)-(Z-Zk-1)=Gb-Ga \qquad (2).$$

Equation (2) can be expressed as $$Z-Zk-1=(Zb-Zk-1)-(Gb-Ga) \qquad (3).$$

A value obtained from the subtraction Gb−Ga is evident from FIG. 2, and a value obtained by the subtraction Zb−Zk−1 is constant irrespective of the shape to be machined and the depth to be machined. Therefore, Zk−1 is previously calculated, and the end position Zk−1 for the machining of the (k−1)-th step and the starting position for the powder-mixed electrical discharge machining of the k-th step are detected. If the difference between Zk−1 and Z satisfies the conditions expressed by Equation (4)

$$Z-Zk-1 \leq (Zb-zk-1)-(Gb-Ga)=\alpha(\alpha \text{ is a constant}) \qquad (4),$$

it is determined that the concentration of the mixed powder is less than 10 (g/l). As a result, it will be possible to prevent the deterioration of the mirror property of a machined surface by increasing the concentration of the mixed powder.

Upon receipt of a machining end signal for the (k−1)-th machining step from the control unit 4 and an electrode positional signal output from a linear scale 11 at the time of completing the (k−1)-th step, the machining operation end position detecting unit 31 detects the position Zk−1 of the electrode when the (k−1)-th step is completed. The detected position is the output to the machining position comparison unit 32. Upon receipt of a machining start signal with regard to the k-th step, in which a powder-mixed electrical discharge machining operation is carried out, from the control unit 4, and an electrode position signal from the linear scale 11 obtained at the time of starting the k-th machining step, the machining operation starting position detecting unit 30 detects a starting position Z for a machining operation of the k-th machining step. The thus detected position is output to the machining position comparison unit 32. Upon receipt of Zk−1 and Z, the machining position comparison unit 32 calculates the difference between Z and Zk−1. If the difference becomes less than the predetermined constant α, namely, if the relationship expressed by Equation (4) is achieved, the machining position comparison unit 32 determines that the concentration of the mixed powder in the gap has dropped. Signals are then sent to the control valve 35 and the machining condition changing unit 33. Upon receipt of the signal, the control valve 35 is opened for a predetermined period of time, so that the powdered substance 15 stored in the powder feeding unit 34 is fed to the working fluid tank 13. Consequently, the concentration of the powder in the powder-mixed working fluid 16 is increased.

Upon receipt of the signal from the machining position comparison unit 32, the machining condition changing unit 33 outputs a signal to the control unit 4 in order to increase the value of the reference voltage Vref set in the reference voltage setting unit 7. Upon receipt of the signal, the control unit 4 sends a signal to the reference voltage setting unit 7, whereby the value of the reference voltage Vref is set to an increased level. For instance, if the reference voltage is set to 40 (V), the reference voltage is set so as to increase by about 10 (V). If the reference voltage Vref has increased, the length of the gap is controlled so that Vave in Equation (1) can be increased. All that is necessary to increase Vave is to increase a discharge delay time To. For this reason, the occurrence of the electrical discharge is controlled so as to be delayed by increasing the length of the gap. As a result, the length of the gap is increased, and it becomes easy for the powdered substance 15 to enter the gap, whereby the concentration of the mixed powder in the gap increases.

Upon receipt of the signal from the machining position comparison unit 32, the machining condition changing unit 33 outputs the signal to the control unit 4 so as to increase the quiescent time Toff which is set on the machining conditions at that time. Upon receipt of that signal, the control unit 4 outputs a signal to the machining power source 5. The machining power source 5 sets the quiescent time Toff so that it can be increased, and an electrical discharge pulse is applied to the gap. For example, if the quiescent time is 4 ($\mu$s), the quiescent time is set so as to be doubled, i.e., it is set so as to become about 8 ($\mu$s). The longer the quiescent time Toff becomes, the smaller Vave in Equation (1) becomes. Therefore, the length of the gap is controlled so that Vave can be constantly maintained. To hold Vave constant, it is only required to increase the discharge delay time To. For this reason, the occurrence of the electrical discharge is controlled so as to be delayed by increasing the length of the gap. Consequently, the length of the gap increases, which in turn makes it easy for the powdered substance 15 to enter the gap. Hence, the concentration of the mixed powder in the gap increases.

Upon receipt of the signal from the machining position comparison unit 32, the machining condition changing unit 33 outputs the signal to the control unit 4 so that the regular amount of the lift of the electrode at that time can be increased. Upon receipt of that signal, the control unit 4 outputs a signal to a servo motor 8, and the servo motor 8 actuates so as to increase the regular amount of the lift of the electrode. For instance, if the regular amount of the lift of the electrode is 0.5 (mm), the regular amount of the lift of the electrode is increased so as to be doubled, i.e., it is increased so as to become about 1 (mm). Consequently, the length of the gap increases, and it becomes easy for the powdered substance 15 to enter the gap, whereby the concentration of the mixed powder in the gap increases.

In this way, after the receipt of the signal from the machining starting position comparison unit 32, the powdered substance is fed into the working fluid, or the length of the gap is increased by increasing the reference voltage Vref, the quiescent time Toff, or the regular amount of the lift of the electrode, which makes it easy for the powdered substance 15 to enter the gap. As a result, it is possible to reliably achieve a desired mirror surface as well as to increase the concentration of the mixed powder.

(SECOND EMBODIMENT)

Figure 4:
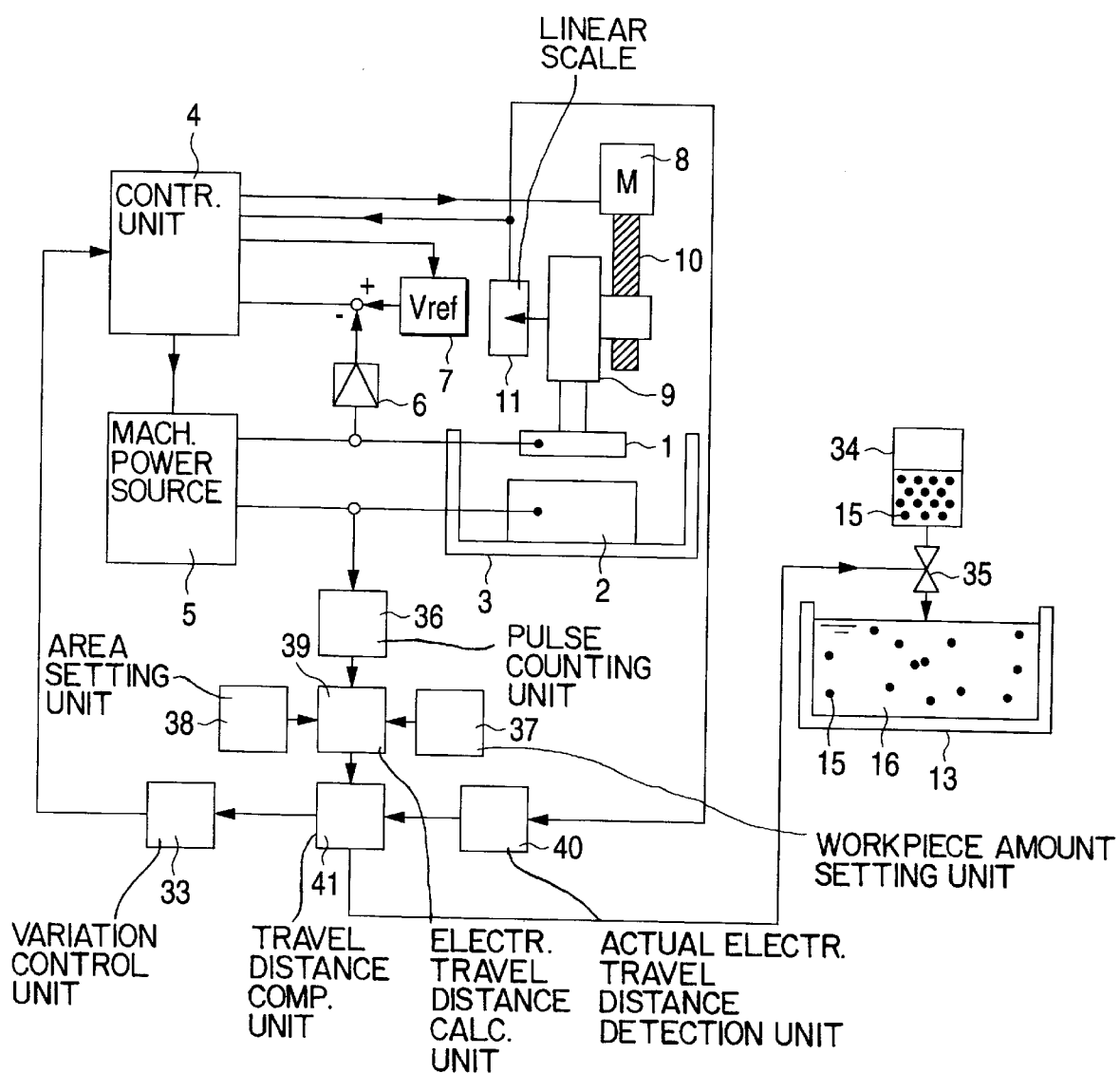
FIG. 4 is a block diagram showing the configuration of an electrical discharge apparatus according to a second embodiment of the present invention.

FIG. 4 is a block diagram showing an electrical discharge apparatus according to a second embodiment of the present invention. As shown in FIG. 4, the electrical discharge apparatus comprises a unit 36 for counting the number of effective discharge pulses which contribute to a machining operation for every predetermined time, a unit 37 for setting the amount of a workpiece to be machined per electrical discharge pulse for every machining condition, a unit 38 for setting the area to be machined, a unit 39 for calculating the travel distance of the electrode 1 (i.e., a scheduled travel distance of the electrode 1) per predetermined time, from the number of effective discharge pulses per unit of time detected by the effective discharge pulse number counting unit 36, the amount of the workpiece to be machined per electrical discharge pulse set in the machining amount setting unit 37, and the area to be machined set in the area setting unit 38, a unit 40 for detecting the actual travel distance of the electrode 1 per unit of time upon receipt of a signal from the linear scale 11, and a unit 41 for comparing the travel distance of the electrode per predetermined time calculated by the electrode travel distance calculating unit 39 with the actual travel distance per predetermined time detected by the electrode travel distance detecting unit 40.

Figure 5:
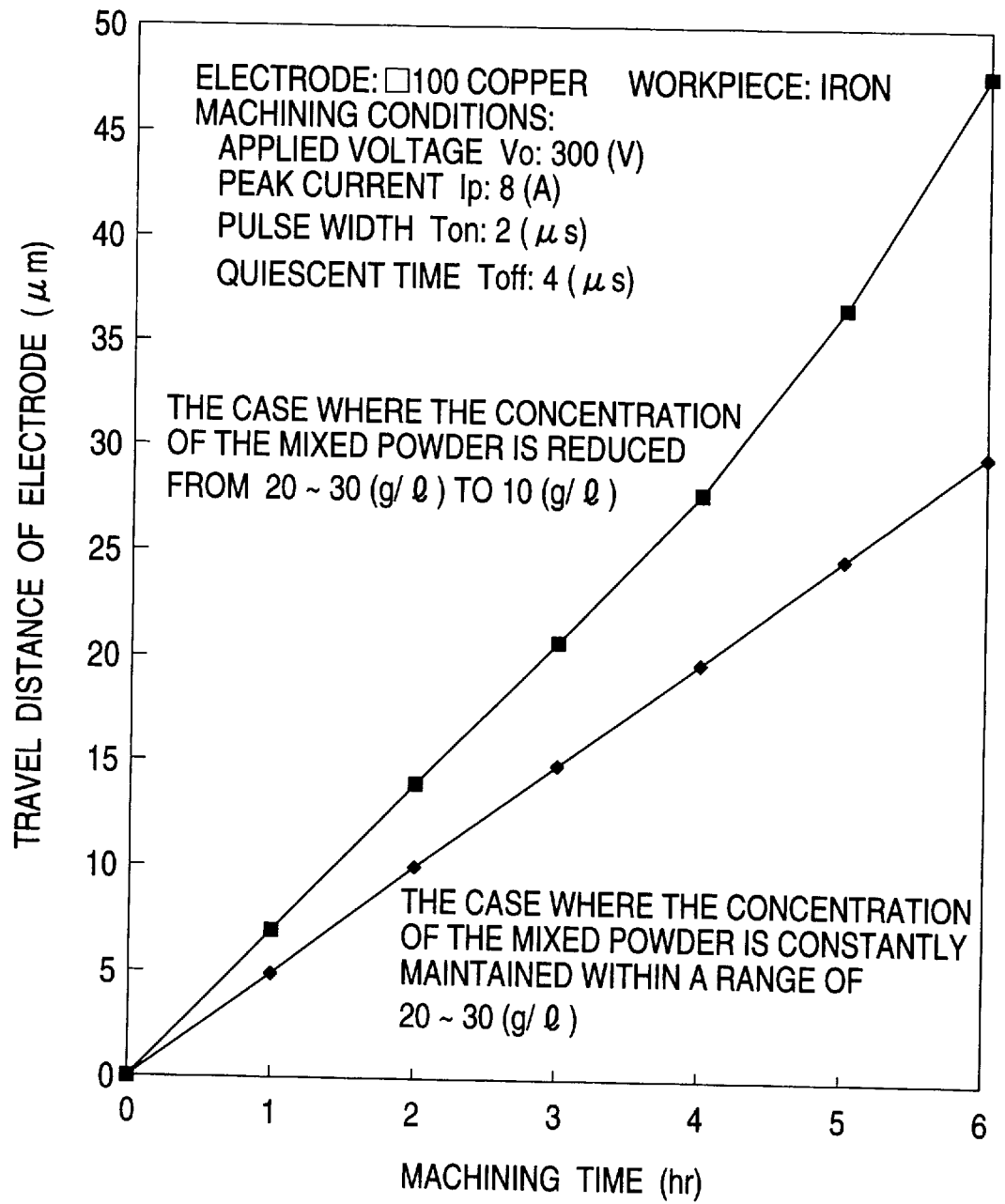
FIG. 5 is a plot showing the relationship between a machining time and the travel distance of the electrode for different concentrations of the mixed powder.
Figure 7:
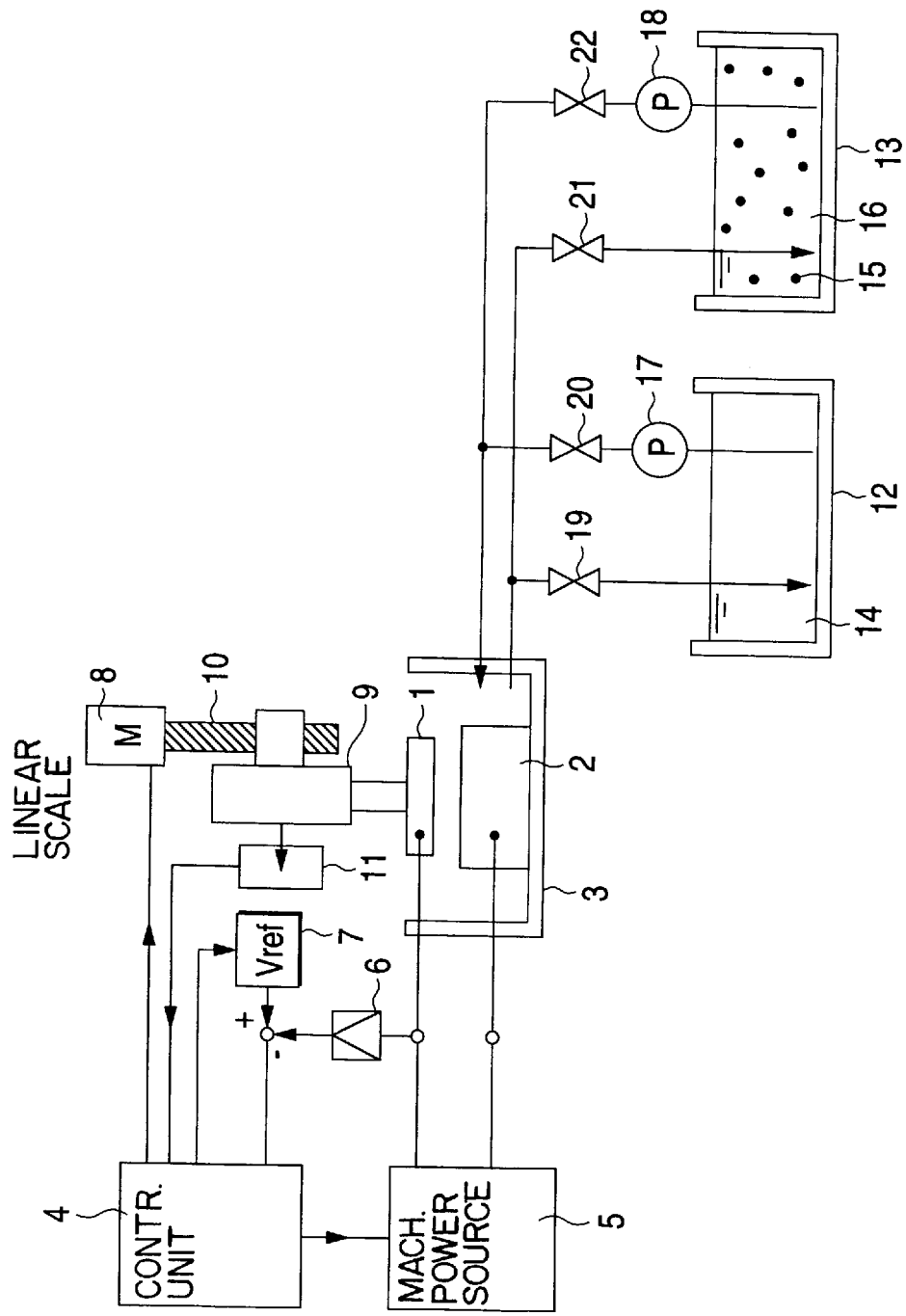
FIG. 7 is a block diagram showing a conventional electrical discharge machine.
Figure 8A:
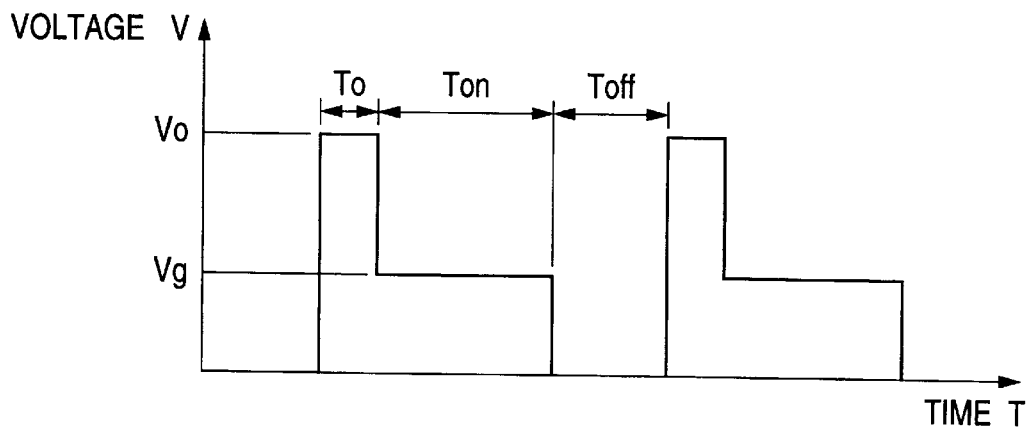
FIGS. 8A to 8C are plots respectively showing the relationship between the length of the machining gap and a discharge voltage.
Figure 8B:
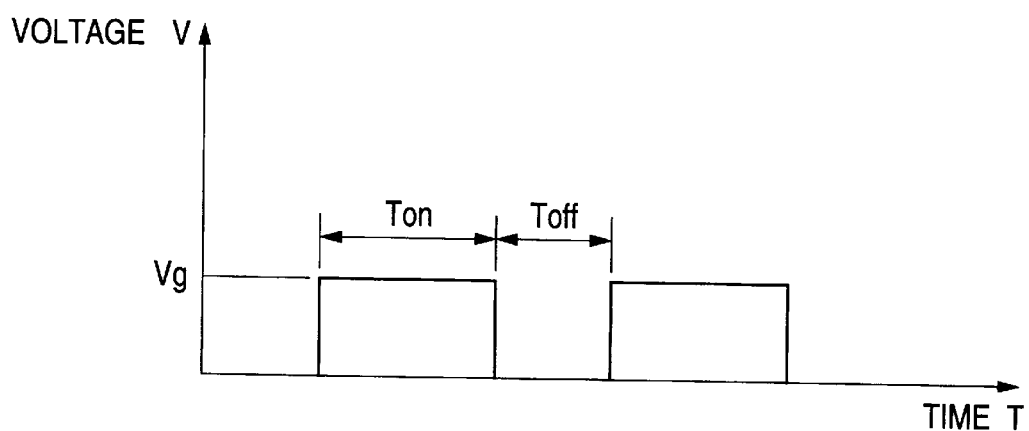
Figure 8C:
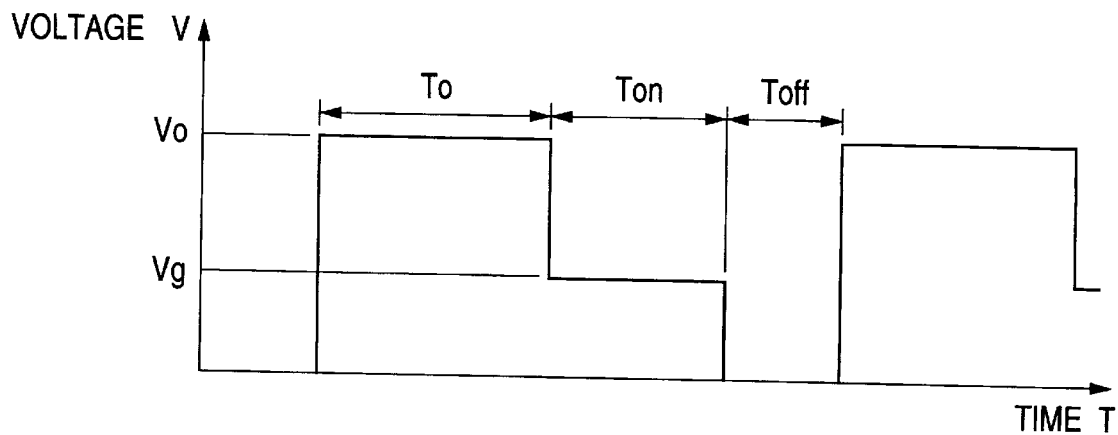

The operation of the electrical discharge apparatus will now be described. Even if the concentration of the mixed powder at the starting point for the machining operation is 20–30 (g/l), the powder precipitates out of the working fluid as a result of stagnation of the working fluid stream in the manner as previously described. Therefore, if the machining time becomes longer, the precipitation of the powdered substance 15 progresses further. As a result, the concentration of the mixed powder decreases to less than 10 (g/l) during the course of the machining operation, and hence the mirror surface is not obtained. FIG. 5 shows the relationship between the time for the powder-mixed electrical discharge machining operation and the amount of the progress of the machining operation. If the concentration of the mixed powder is constantly held at a level of 20 to 30 (g/l), the machining time becomes proportional to the amount of the progress of the machining operation, and a machining rate defined by the machining conditions at that time becomes the constant of proportionality. If the concentration of the mixed powder is decreased during the course of the machining operation, the length of the gap is also decreased even under identical machining conditions, as shown in FIG. 2. For this reason, the amount of the progress of the machining operation increases proportional to the decrease in the length of the gap, as shown in FIG. 5.

During the electrical discharge machining operation, the electrode is positioned away from the surface of the workpiece 2 so as to be machined by only the length of the gap determined by the machining conditions at that time. The length of the gap is constantly controlled such that an appropriate distance is ensured in the manner as previously mentioned. Therefore, when the powder-mixed electrical discharge machining of the k-th step is started, the machining operation continues while the length of the gap Gb is maintained until the k-th machining operation is completed, unless a drop in the concentration of the mixed powder occurs. Assuming that the amount of the workpiece to be machined per electrical discharge on the working conditions at that time is V, that the area to be machined is S, that the number of effective discharge pulses per predetermined time is m, and that the specific gravity of the workpiece is $\rho$, the travel distance Lb per predetermined time at that time can be approximated to $$Lb = M \cdot V / \rho \cdot S \tag{8}$$

However, if the concentration of the mixed powder in the gap during the predetermined period of time becomes 10 (g/l), and if the length of the gap at that time becomes Ga, a reduction $\Delta G$ in the length of the gap will be expressed as $$\Delta G = Gb - Ga \tag{9}$$

Further, the travel distance La of the electrode at that time becomes the sum of a distance Lb, over which the electrode travels as a result of the machining operation, and the reduction $\Delta G$ in the length of the gap. Specifically, La is expressed as $$La = Lb + \Delta G \tag{10}$$

Accordingly, the reduction $\Delta G$ in the length of the gap resulting from a drop in the concentration of the mixed powder is given by $$\Delta G = La - Lb \tag{11}$$

$\Delta G$ in Equation (11) is self-evident from FIGS. 2 and 5. The actual travel distance L of the electrode at a predetermined time and the travel distance L' of the electrode, which is calculated on the assumption that the concentration of the mixed powder does not decrease, are respectively detected. If the difference between them satisfies the relationship defined by Equation (12), namely, $$L - L' \geq La - Lb = \beta \text{ ($\beta$ is a constant)} \tag{12}$$

it is determined that the concentration of the mixed powder is less than 10 (g/l). It is possible to prevent the mirror property of the machined surface from being deteriorated if the concentration of the mixed powder is increased.

The electrode travel distance calculating unit 39 calculates the distance L' over which the electrode traveled during a predetermined period of time when the concentration of the mixed powder is not decreased, from the number of effective electrical discharge pulses which contribute to the machining operation for every predetermined time and are detected by the effective discharge pulse number detecting unit 36, the amount of the workpiece to be machined per discharge pulse for every machining condition set by the machining amount setting unit 37, and the area to be machined for every machining condition set in the area setting unit 38, using Equation (8). The thus calculated travel distance L' is output to the electrode travel distance comparison unit 41. The effective discharge pulse number counting unit 36 detects high frequency components of the discharge voltage using such a method as disclosed in the Unexamined Japanese Patent Application Publication. No. Hei.5-293714, and then integrates the thus detected high frequency components. If a resultant value is more than the reference value, the discharge voltage is judged as an effective discharge pulse. Then, the effective discharge pulse number counting unit 36 counts the pulses for every predetermined time. The electrode travel distance detecting unit 40 detects the actual travel distance L of the electrode 1 per unit of time, upon receipt of the signal from the linear scale 11. The thus detected travel distance L is output to the electrode travel distance comparison unit 41. Upon receipt of L and L', the electrode travel distance comparison unit 41 calculates the difference between L and L'. If the difference increases more than the predetermined value $\beta$, that is, if the relationship given by Equation (12) is satisfied, the electrode travel distance comparison unit 35 determines that the concentration of the mixed powder in the gap decrease to less than 10 (g/l). Then, a signal is output to the control valve 35 and the machining condition changing unit 33, respectively. Upon receipt of the signal, the control valve 35 is opened only for a predetermined period of time, so that the powdered substance 15 stored in the powder feeding unit 34 is fed to the working fluid tank 13. As a result, the concentration of the mixed powder in the powder-mixed working fluid 16 is increased.

Upon receipt of the signal from the electrode travel distance comparison unit 41, the machining condition changing unit 33 outputs the signal to the control unit 4 so as to increase the reference voltage Vref set in the reference voltage setting unit 7. Upon receipt of that signal, the control unit 4 also outputs a signal to the reference voltage setting unit 7, so that the reference voltage Vref is set to a larger value. For example, if the reference voltage has been set to 40 (V), the reference voltage is increased by about 10 (V). As a result of the increase in the reference voltage Vref, the length of the gap is controlled so that Vave in Equation (1) can increase. It is only required to increase the delay time To in order to increase Vave. For this reason, the occurrence of the electrical discharge is controlled so as to be delayed by increasing the length of the gap. Consequently, the length of the gap increases, which in turn makes it easy for the powdered substance 15 to enter the gap. Therefore, the concentration of the mixed powder in the gap increases.

Further, upon receipt of the signal from the electrode travel distance comparison unit 41, the machining condition changing unit 33 outputs the signal to the control unit 4 so as to increase the quiescent time Toff set in the machining condition at that time. Upon receipt of that signal, the control unit 4 outputs the signal to the machining power source 5, whereby the machining power source 5 sets the quiescent time Toff so that it can be increased. Then, the discharge pulse is applied to the gap. For example, if the quiescent time is 4 ($\mu$s), it will be doubled, namely, it will be increased to about 8 ($\mu$s). If the quiescent time Toff becomes longer, Vave in Equation (1) will become smaller. For this reason, the length of the gap is controlled so that Vave can be maintained at a constant value. It is only required to increase the discharge delay time To in order to maintain Vave constant. Therefore, the occurrence of the electrical discharge is controlled so as to be delayed by increasing the length of the gap. The length of the gap is consequently increased, which makes it easy for the powdered substance 15 to enter the gap. As a result, the concentration of the mixed powder in the gap increases.

Upon receipt of the signal from the electrode travel distance comparison unit 41, the machining condition changing unit 33 outputs the signal to the control unit 4 so as to increase the regular amount of the lift of the electrode at that time. Upon receipt of that signal, the control unit 4 outputs the signal to the servo motor 8. The servo motor 8 is actuated so as to increase the regular amount of the lift of the electrode. For instance, if the timed lift of the electrode is 0.5 (mm), the regular amount of the lift of the electrode will be doubled, namely, it will be increased to about 1 (mm). Consequently, the length of the gap is increased, which in turn makes it easy for the powdered substance 15 to enter the gap. As a result, the concentration of the mixed powder in the gap increases.

Evidently, the powder-mixed electrical discharge machining operation at the k+1-th step will be carried out in the same manner as previously described.

After the receipt of the signal from the electrode travel distance comparison unit 41, the powdered substance is fed into the working fluid, or the length of the gap is increased by increasing the reference voltage Vref, the quiescent time Toff, or the regular amount of the lift of the electrode, which makes it easy for the powdered substance 15 to enter the gap. As a result, it is possible to reliably achieve a desired mirror surface as well as to increase the concentration of the mixed powder.

The following effects will be obtained by the electrical discharge apparatus having the above described configurations.

When a multistage machining operation is carried out, the concentration of the mixed powder in the working fluid is determined by comparing the end position for the machining in a certain step with the starting position for the machining of the next step. If it has been determined that the concentration of the mixed powder is small, the powdered substance is fed into the working fluid, whereby the concentration of the mixed powder is increased. As a result, it is possible to prevent the deterioration of the mirror property of the machined surface resulting from the reduction in the concentration of the mixed powder. Consequently, a desired mirror surface can be obtained.

When a multistage machining operation is carried out, the concentration of the mixed powder in the working fluid is determined by comparing the end position for the machining in a certain step with the starting position for the machining of the next step. If it has been determined that the concentration of the mixed powder is small, the machining condition is changed so as to increase the length of the gap. As a result, it becomes easy for the powdered substance to enter the gap, which in turn increases the concentration of the mixed powder. Accordingly, it is possible to prevent the deterioration of the mirror property of the machined surface due to the reduction in the concentration of the mixed powder, and hence a desired mirror surface can be obtained.

The travel distance of the electrode per predetermined time is calculated from the number of effective pulses which contribute to the machining operation at every predetermined period of time, the amount of the workpiece to be machined every one electrical discharge pulse under every electrical discharge machining condition, and the area to be machined under every machining condition. The thus obtained travel distance of the electrode is compared to the distance over which the electrode actually travels per predetermined time, whereby the concentration of the mixed powder in the working fluid is determined. If the concentration of the mixed powder has been determined as being small, the powdered substance is fed into the working fluid. Hence, the concentration of the mixed powder is increased, which in turn prevents the deterioration of the mirror property of the machined surface due to the reduction in the concentration of the mixed powder. Therefore, a desired mirror surface can be achieved.

The travel distance of the electrode per predetermined time is calculated from the number of effective pulses which contribute to the machining operation at every predetermined period of time, the amount of the workpiece to be machined every one electrical discharge pulse under every electrical discharge machining condition, and the area to be machined under every machining condition. The thus obtained travel distance of the electrode is compared to the distance over which the electrode actually travels per predetermined time, whereby the concentration of the mixed powder in the working fluid is determined. If the concentration of the mixed powder has been determined as being small, the powdered substance is fed into the working fluid. Hence, the concentration of the mixed powder is increased, which in turn prevents the deterioration of the mirror property of the machined surface due to the reduction in the concentration of the mixed powder. Therefore, a desired mirror surface can be achieved.

What is claimed is:

1. An electrical discharge apparatus for machining a workpiece by applying a pulse voltage within a working fluid which includes a mixture of a powdered substance and is filled into a gap between an electrode and the workpiece, when a multistage machining operation is carried out, said electrical discharge apparatus comprising:

means for detecting a starting position for a machining operation at each machining step;

means for detecting an end position for the machining operation at each machining step;

means for comparing an end position for the machining of a previous machining step detected by said means for detecting an end position for the machining operation with a starting position for the machining operation of a next machining step detected by said means for detecting a starting position for the machining operation; and means for changing machining conditions depending on a comparison result output from said means for comparing the positions for the machining operation.

2. The electrical discharge apparatus of claim 1, wherein said means for comparing the positions for the machining operation judges that a concentration of the powdered substance in the work fluid is small, if a difference between the starting position for the machining operation of the next machining step detected by said means for detecting the starting position and the end position for the machining operation of the previous machining step detected by said means for detecting the end position is smaller than a predetermined value.

3. The electrical discharge apparatus of claim 2, further comprising:

means for feeding the powdered substance into the working fluid, if said means for comparing the positions for the machining operation judges that a concentration of the powdered substance in the working fluid is small.

4. The electrical discharge machining apparatus of claim 1, wherein said means for changing the machining conditions changes a reference voltage with respect to a discharge voltage developing in the gap.

5. The electrical discharge machining apparatus of claim 1,
wherein said means for changing the machining conditions changes a quiescent time of an electrical discharge.

6. The electrical discharge machining apparatus of claim 1,
wherein said means for changing the machining conditions changes a regular amount of lift of the electrode.

7. An electrical discharge apparatus for machining a workpiece by applying a pulse voltage within a working fluid which includes a mixture of a powdered substance and is filled into a gap between an electrode and the workpiece, said electrical discharge apparatus comprising:
means for counting the number of the effective electrical discharge pulses which contribute to a machining operation for every predetermined time;
means for setting the amount of the workpiece to be machined per electrical discharge pulse under each electrical discharge machining condition;
means for setting an area to be machined under each electrical discharge machining condition;
means for calculating a scheduled distance over which the electrode travels during a predetermined period of time, from the number of the effective electrical discharge pulses detected by said means for counting the number of the effective electrical discharge pulses, the amount of the workpiece to be machined per electrical discharge pulse set in said means for setting the amount of the workpiece to be machined, and the area to be machined set in said means for setting the area to be machined;
means for detecting the distance over which the electrode actually travels during the machining operation, for every predetermined time;
means for comparing the scheduled travel distance calculated by said means for calculating a scheduled travel distance with the actual travel distance detected by said means for detecting the distance over which the electrode travel distance; and
means for changing the machining conditions in response to a comparison result output from said means for comparing the electrode travel distances.

8. The electrical discharge machining apparatus of claim 7,
wherein said means for changing the machining conditions changes a reference voltage with respect to a discharge voltage developing in the gap.

9. The electrical discharge machining apparatus of claim 7,
wherein said means for comparing the electrode travel distance judges that a concentration of the powdered substance in the work fluid is small, if the difference between the travel distance of the electrode detected by said means for detecting the electrode travel distance and the scheduled travel distance calculated by said means for calculating the electrode travel distance is more than a predetermined value.

10. The electrical discharge machining apparatus of claim 9, further comprising:
means for feeding the powdered substance into the working fluid, if said means for comparing the electrode travel distances judges that a concentration of the powdered substance in the working fluid is small.

11. The electrical discharge machining apparatus of claim 4,
wherein said means for changing the machining conditions changes a quiescent time of an electrical discharge.

12. The electrical discharge machining apparatus of claim 7,
wherein said means for changing the machining conditions changes a regular amount of lift of the electrode.

13. An electrical discharge machining method for machining a workpiece by applying a pulse voltage within a working fluid which includes a mixture of a powdered substance and is filled into a gap between an electrode and the workpiece, when a multistage machining operation is carried out, said electrical discharge machining method comprising the steps of:
detecting a starting position for the machining at each machining step;
detecting an end position for the machining at each machining step;
comparing the detected end position for the machining of a previous machining step with the detected starting position for the positioning of a next machining step; and
changing the machining conditions depending on a comparison result output obtained in said step of comparing the positions for the machining operation.

14. The electrical discharge machining method of claim 13, wherein it is judged, in said step of comparing the positions for the machining operation, that the concentration of the powdered substance in the work fluid is small, if the difference between the starting position for the machining of the next machining step detected at the machining starting position detecting step and an end position for the machining of the previous machining step detected at the machining end position detecting step is smaller than a predetermined value.

15. The electrical discharge machining method of claim 14, further comprising a step of:
feeding the powdered substance into the working fluid if it is judged that the concentration of the powdered substance in the working fluid is small.

16. An electrical discharge machining method for machining a workpiece by applying a pulse voltage within a working fluid which includes a mixture of a powdered substance and is filled into a gap between an electrode and the workpiece, said electrical discharge machining method comprising the steps of:
counting the number of the effective electrical discharge pulses which contribute to a machining operation for every predetermined time;
setting the amount of the workpiece to be machined per electrical discharge pulse under each electrical discharge machining condition;
setting an area to be machined under each electrical discharge machining condition;
calculating a scheduled distance over which the electrode travels during a predetermined period of time, from the number of the effective electrical discharge pulses detected by said step of counting the number of the effective electrical discharge pulses, the amount of the workpiece to be machined per electrical discharge pulse set in said step of setting the amount of the workpiece to be machined, and the area to be machined set in said step of setting the area to be machined;
detecting the distance over which the electrode actually travels during the machining operation, for every predetermined time;

comparing the scheduled travel distance calculated by said step of calculating a scheduled travel distance with the actual travel distance detected by said step of detecting the distance over which the electrode travels; and changing the machining conditions in response to a comparison result output from said step of comparing the electrode travel distances.

17. The electrical discharge machining method of claim 16, wherein it is judged, in said step of comparing the electrode travel distances, that a concentration of the powdered substance in the work fluid is small, if the difference between the travel distance of the electrode detected by said step of detecting the electrode travel distance and the scheduled travel distance calculated by said step of calculating the electrode travel distance is more than a predetermined value.

18. The electrical discharge machining method of claim 17, further comprising a step of:

feeding the powdered substance into the working fluid, if said step of comparing the electrode travel distances judges that a concentration of the powdered substance in the working fluid is small.

* * * * *